United States Patent
Iwama

(10) Patent No.: US 11,181,433 B2
(45) Date of Patent: Nov. 23, 2021

(54) CENTER-OF-MASS HEIGHT ESTIMATION DEVICE

(71) Applicant: ISUZU MOTORS LIMITED, Tokyo (JP)

(72) Inventor: Toshihiko Iwama, Yamato (JP)

(73) Assignee: ISUZU MOTORS LIMITED, Tokyo (JP)

( * ) Notice: Subject to any disclaimer, the term of this patent is extended or adjusted under 35 U.S.C. 154(b) by 272 days.

(21) Appl. No.: 16/605,488

(22) PCT Filed: Apr. 11, 2018

(86) PCT No.: PCT/JP2018/015197
§ 371 (c)(1),
(2) Date: Oct. 15, 2019

(87) PCT Pub. No.: WO2018/193928
PCT Pub. Date: Oct. 25, 2018

(65) Prior Publication Data
US 2020/0264064 A1 Aug. 20, 2020

(30) Foreign Application Priority Data
Apr. 17, 2017 (JP) .............................. JP2017-081676

(51) Int. Cl.
*G01M 1/12* (2006.01)
*B60G 15/08* (2006.01)

(52) U.S. Cl.
CPC ............. *G01M 1/122* (2013.01); *B60G 15/08* (2013.01); *B60G 2202/152* (2013.01);
(Continued)

(58) Field of Classification Search
CPC . G01M 1/122; B60G 15/08; B60G 2202/152; B60G 2400/104;
(Continued)

(56) References Cited

U.S. PATENT DOCUMENTS 5,825,284 A * 10/1998 Dunwoody ........ B60G 17/0185
340/440
2003/0055549 A1* 3/2003 Barta .................. B60W 10/184
701/70
(Continued)

FOREIGN PATENT DOCUMENTS

DE 19918525 A1 * 10/1999 .......... B60T 8/17551
EP 1319535 A2 * 6/2003 ......... B60G 17/0162
(Continued)

OTHER PUBLICATIONS

International Search Report and Written Opinion for related International Application No. PCT/JP2018/015197, dated Jul. 10, 2018; English translation of ISR provided; 10 pages.

*Primary Examiner* — James A English
*Assistant Examiner* — Kurtis Nielson
(74) *Attorney, Agent, or Firm* — Procopio, Cory, Hargreaves & Savitch LLP

(57) ABSTRACT

A center-of-mass height estimation device includes a roll moment calculation unit for calculating roll moment of a sprung portion in a vehicle on the basis of bearing capacities of left and right suspensions provided on the vehicle, a lateral acceleration measurement unit for measuring lateral acceleration, which is acceleration in a width direction of the vehicle, a mass measurement unit for measuring mass of the sprung portion, a transfer function calculation unit for calculating a transfer function of the roll moment with respect to the lateral acceleration, and a center-of-mass height calculation unit for dividing the gain of the transfer function by the mass of the sprung portion to calculate a height from a roll center of the vehicle to a center of mass of the sprung portion.

4 Claims, 9 Drawing Sheets

(52) U.S. Cl.
CPC .............. *B60G 2400/104* (2013.01); *B60G 2400/51222* (2013.01); *B60G 2400/61* (2013.01)

(58) Field of Classification Search
CPC ...... B60G 2400/51222; B60G 2400/61; B60G 2400/63; B60W 40/112; B60W 2040/1315
See application file for complete search history.

(56) References Cited

U.S. PATENT DOCUMENTS

| | | | | |
|---|---|---|---|---|
| 2005/0273241 A1* | 12/2005 | Tsukasaki | ............. | G01M 1/122 701/70 |
| 2006/0276944 A1* | 12/2006 | Yasui | ................... | B60T 8/1755 701/37 |
| 2007/0027596 A1* | 2/2007 | Stavroff | ............... | B60W 30/04 701/38 |
| 2007/0067080 A1* | 3/2007 | Messih | ................... | B60T 8/172 701/37 |
| 2007/0129867 A1* | 6/2007 | Huang | ................. | B60W 30/04 701/124 |
| 2008/0281488 A1* | 11/2008 | Ryu | ..................... | B60G 17/016 701/38 |
| 2009/0099718 A1* | 4/2009 | Kobetz | .................... | B60T 8/24 701/31.4 |
| 2009/0235724 A1 | 9/2009 | Ryu et al. | | |
| 2010/0036597 A1* | 2/2010 | Fiedler | ................ | B60G 17/019 701/124 |
| 2014/0012468 A1* | 1/2014 | Le | ........................... | G06F 11/30 701/38 |
| 2018/0306665 A1* | 10/2018 | Doray | .................. | G01M 1/122 |
| 2020/0384823 A1* | 12/2020 | Shukla | .............. | B60G 17/0182 |

FOREIGN PATENT DOCUMENTS

| | | | | |
|---|---|---|---|---|
| FR | 2922014 A3 * | 4/2009 | ......... | G01M 17/007 |
| JP | H11-304663 A | 11/1999 | | |
| JP | 2007-022287 A | 2/2007 | | |
| JP | 2017-101987 A | 6/2017 | | |
| WO | 2008-150221 A1 | 12/2008 | | |

* cited by examiner

CENTER-OF-MASS HEIGHT ESTIMATION DEVICE

CROSS-REFERENCE TO RELATED APPLICATIONS

This application is a U.S. National Stage entry of PCT Application No: PCT/JP2018/015197 filed on Apr. 11, 2018, which claims priority to Japanese Patent Application No. 2017-081676, filed Apr. 17, 2017, the contents of which are incorporated herein by reference.

TECHNICAL FIELD

The present disclosure relates to a center-of-mass estimation device for estimating a height of a center of mass in a vehicle such as a commercial vehicle.

BACKGROUND ART

In order to prevent a vehicle from rolling over, it is important to estimate a height of a center of mass in the vehicle. In particular, in a commercial vehicle, since a position of a center of mass of an entire vehicle greatly changes due to a load state, it is important to estimate a height of a center of mass in a state where a load is loaded.

As a technique for estimating a height of a center of mass in a vehicle, for example, the following proposals have been made (with reference to Patent Literature 1).

That is, in Patent Literature 1, a suspension device capable of adjusting a height of a roll center is provided, and the roll behavior is made constant by adjusting a height of a roll center of front and rear wheels in a case where a loading condition changes.

Specifically, a height of a target roll center of front and rear wheels is obtained, and an actuator of the suspension device is controlled to make a height reach the height of the target roll center.

Here, the height of the target roll center of the front and rear wheels is obtained by the following procedures (with reference to paragraphs [0016] to [0017] of Patent Literature 1).

That is, a height of a center of mass of an occupant in a state where the occupant gets on the vehicle is considered to be constant, and a height of a center of mass of a sprung vehicle body in the state where the occupant gets on the vehicle is obtained based on a change of mass of the sprung vehicle body in the state where the occupant gets on the vehicle and a height of a center of mass and mass of the sprung vehicle body in an empty state. Then, the height of the target roll center necessary for maintaining the roll moment corresponding to turning lateral acceleration in a reference state is obtained, and the height of the target roll center is distributed to the front and rear wheels.

CITATION LIST

Patent Document

Patent Literature 1: JP-A-2007-22287

SUMMARY OF THE INVENTION

Technical Problem

In the technique described in Patent Literature 1, the height of the center of muss of the occupant in a state where the occupant gets on the vehicle is constant. However, in a commercial vehicle mainly for transporting a load, an arrangement or mass of the load corresponding to the occupant of Patent Literature 1 changes significantly each time the commercial vehicle stops at a distribution base or the like. Thus, the height of the center of mass of the load is not constant in an actual commercial vehicle.

An object of the present disclosure is to provide a center-of-mass height estimation device capable of estimating a height of a center of mass of an sprung portion of the vehicle with higher accuracy even in a case where an arrangement or mass of a load loaded on the sprung portion of the vehicle variously changes and a height of a center of mass of the load changes.

Solution to Problem

A center-of-mass height estimation device of the present disclosure includes: a roll moment calculation unit configured to calculate roll moment of a sprung portion in a vehicle based on bearing capacities of left and right suspensions provided on the vehicle; a lateral acceleration measurement unit configured to measure lateral acceleration, which is acceleration in a width direction of the vehicle; a mass measurement unit configured to measure mass of the sprung portion; a transfer function calculation unit configured to calculate a transfer function of the roll moment with respect to the lateral acceleration; and a center-of-mass height calculation unit configured to divide a gain of the transfer function by the mass of the sprung portion to calculate a height from a roll center of the vehicle to a center of mass of the sprung portion.

The center-of-mass height calculation unit may divide a gain of a transfer function, which corresponds to a frequency equal to or less than a predetermined value among gains of the transfer function, by the mass of the sprung portion to calculate the height from the roll center of the vehicle to the center of mass of the sprung portion.

The center-of-mass height calculation unit may divide a statistic obtained from a plurality of gains of the transfer function, which correspond to a frequency equal to or less than the predetermined value by the mass of the sprung portion to calculate a height from a roll center of the vehicle to the center of mass of the sprung portion.

Each of the left and right suspensions is an air suspension, and the roll moment calculation unit may calculate the roll moment based on a difference between displacements of the left and right suspensions and a difference between pressures in the left and right suspensions.

Advantageous Effects of the Invention

According to the center-of-mass height estimation device of the present disclosure, a height of the center of mass of the sprung portion of the vehicle can be estimated with higher accuracy even in a case where an arrangement or mass of a load loaded on the sprung portion of a vehicle variously changes and a height of a center of mass of the load changes.

DESCRIPTION OF EMBODIMENTS

First Embodiment

Hereinafter, a first embodiment of the present disclosure will be described with reference to FIGS. 1 to 5.

Figure 1:
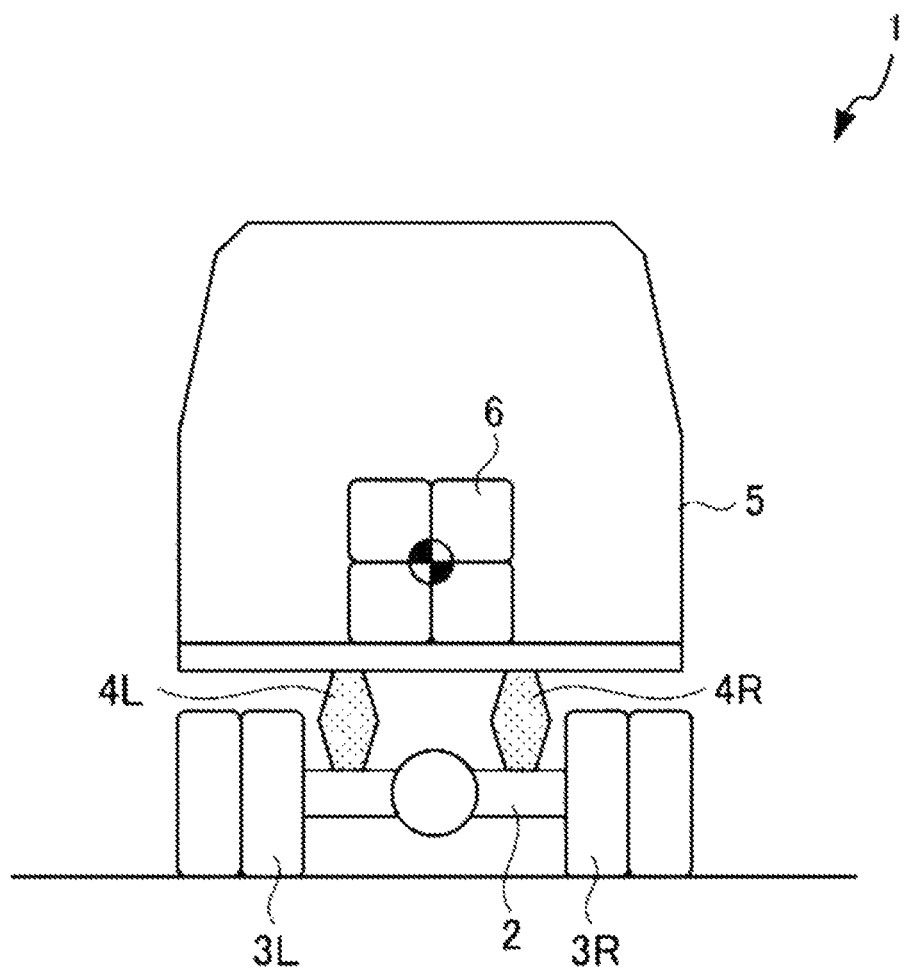
FIG. 1 is a schematic diagram of a vehicle provided with a center-of-mass height estimation device according to a first embodiment, as viewed form a vehicle rear side.

FIG. 1 is a schematic diagram of a vehicle 1 provided with a center-of-mass height estimation device according to a first embodiment of the present disclosure, as viewed form a vehicle rear side.

The vehicle 1 includes an unsprung portion 2, a left rear wheel 3L and a right rear wheel 3R attached to the unsprung portion 2, air suspensions 4L, 4R as an example of left and right suspensions provided on the unsprung portion 2, and a sprung portion 5 supported by the left and right air suspensions 4L, 4R. A load 6 is loaded on the sprung portion 5.

Figure 2:
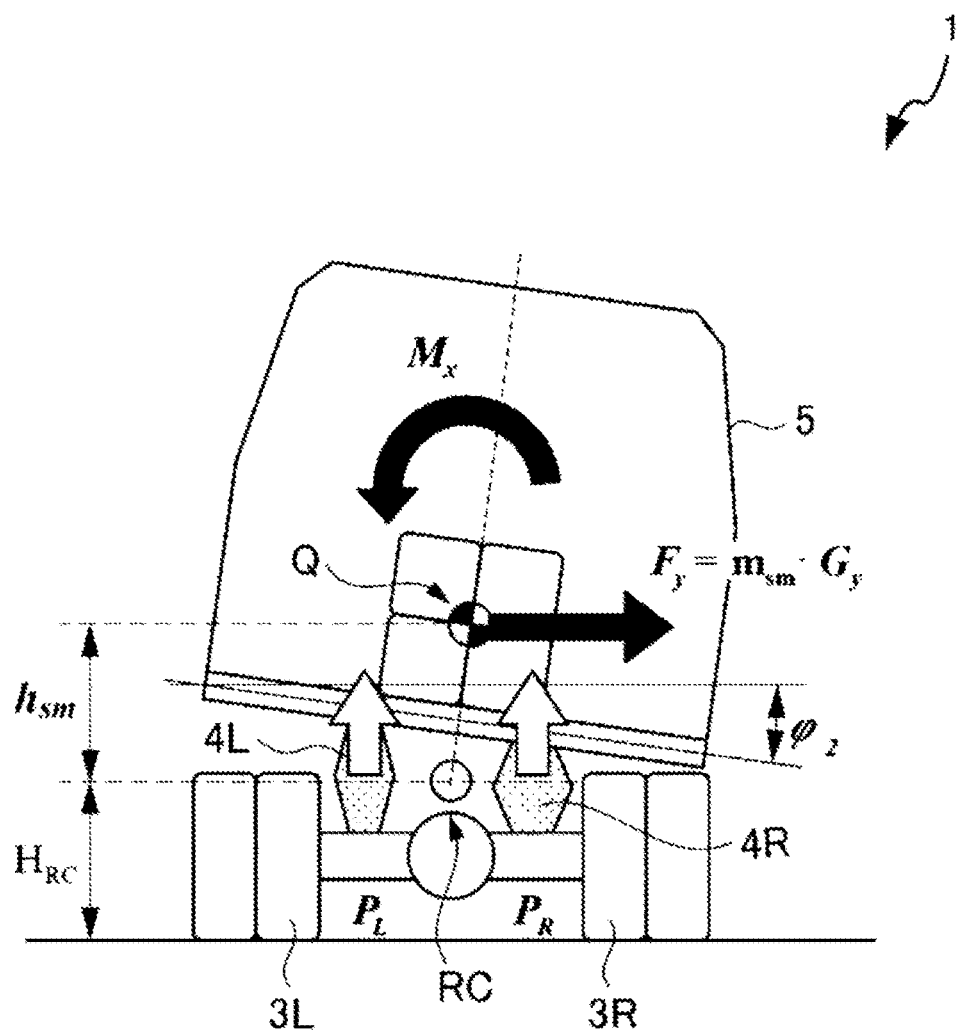
FIG. 2 is an illustrative diagram of moment around a roll center of the vehicle.

FIG. 2 is an illustrative diagram of moment around a roll center RC of the vehicle 1. As shown in FIG. 2, for the vehicle 1, the moment around the roll center RC satisfies the following equation (1). In the equation (1), $M_x$ is roll moment of the sprung portion 5, $h_{sm}$ is a height from the roll center RC to a center of mass Q of the sprung portion 5, and $F_y$ is a centrifugal force acting on the sprung portion 5. In addition, $m_{sm}$ is mass of the sprung portion 5, $G_y$ is lateral acceleration which is acceleration in a width direction of the vehicle 1, and $M_{const}$ is an offset amount of the roll moment of the sprung portion 5 due to the load 6 being laterally displaced and loaded.

$$M_x = h_{sm} \cdot F_y + M_{const} \quad (1)$$

The centrifugal force $F_y$ acting on the sprung portion 5 satisfies the following equation (2).

$$F_y = m_{sm} \cdot G_y \quad (2)$$

The equation (3) is obtained by substituting the equation (2) into the equation (1).

$$M_x = h_{sm} \cdot m_{sm} \cdot G_y + M_{const} \quad (3)$$

An equation established at a time point a of the equation (3) is represented by the equation (4) when a symbol changing with time is attached with a suffix a. An equation established at a time point b different from the time point a is represented by the equation (5) when a symbol changing with time is attached with a suffix b. Here, since it is considered that an arrangement and mass of the load 6 does not change during traveling between distribution bases, the height $h_{sm}$ from the roll center RC of the vehicle 1 to the center of mass Q of the sprung mass 5, the mass $m_{sm}$ of the sprung mass 5, and the offset amount $M_{const}$ of the roll moment of the sprung portion 5 are considered to be constant.

$$M_{xa} = h_{sm} \cdot m_{sm} \cdot G_{ya} + M_{const} \quad (4)$$

$$M_{xb} = h_{sm} \cdot m_{sm} \cdot G_{yb} + M_{const} \quad (5)$$

The following equation (6) is obtained by taking a side-to-side difference of the equation (4) and the equation (5) and modifying for $h_{sm}$, and the height $h_{sm}$ from the roll center RC to the center of mass Q of the sprung portion 5 can be obtained. In the equation (6), D is a proportional coefficient represented by an amount of change of the roll moment $M_x$ of the vehicle 1 with respect to an amount of change of the lateral acceleration $G_y$.

$$h_{sm} = \frac{1}{m_{sm}} \cdot \frac{(M_{xb} - M_{xa})}{(G_{yb} - G_{ya})} = \frac{1}{m_{sm}} \cdot \frac{\Delta M_x}{\Delta G_y} = \frac{1}{m_{sm}} \cdot D \quad (6)$$

In a case where an air suspension is used for a suspension of a rear shaft, the roll moment $M_x$ can also be obtained from a displacement and a pressure of the air suspension of the rear shaft using the following equation (7). In the equation (7), $K_{\varphi13}$ is an integrated roll rigidity that is a sum of roll rigidity of front and rear suspensions other than the air suspension, and is a constant value unique to the vehicle. $M_s$ in the equation (7) is roll moment supported by the air suspensions 4L, 4R of the rear wheels 3L, 3R. $\varphi_2$ is a suspension roll angle, which can be obtained from a distance between the left and right air suspensions 4L, 4R and a difference hd between upper-lower displacements of the left and right air suspensions 4L, 4R.

$$M_x = K_{\varphi13} \cdot \varphi_2 + M_s \quad (7)$$

Here, $M_s$ in the equation (7) can be obtained using the equation (8) based on a distance $Trd_2$ between the left and right air suspensions 4L, 4R and a difference between bearing capacities $P_L$, $P_R$ of the air suspensions.

$$M_s = \frac{Trd_2}{2} \cdot (P_L - P_R) \quad (8)$$

In a case where a mechanical spring such as a leaf spring or a coil spring is used for the front and rear suspensions without using the air suspension, $M_s$ in the equation (7) is set to 0 and the roll moment $M_x$ of the sprung portion can be obtained using the equation (9).

$$M_x = K_{\varphi13} \cdot \varphi_2 \quad (9)$$

In a case where a mechanical spring such as a leaf spring or a coil spring is used for the front and rear suspensions without using the air suspension and displacements of the front, rear, left and right suspensions are known, the roll moment $M_x$ of the sprung portion can also be obtained using the equation (10).

The equation (10) is for a four-wheeled vehicle. In the equation (10), $F_{Z1L}$ is a bearing capacity of a front shaft left suspension on the sprung portion, $F_{Z1R}$ is a bearing capacity of a front shaft right suspension on the sprung portion, $F_{Z2L}$ is a bearing capacity of a rear shaft left suspension on the sprung portion, and $F_{Z2R}$ is a bearing capacity of a rear shaft right suspension on the sprung portion. The bearing capacities $F_Z$ of these suspensions are obtained from the displacement of each suspension in accordance with a previously generated map or the like.

$$M_x = \frac{Trd_1}{2} \cdot (F_{Z1L} - F_{Z1R}) + \frac{Trd_2}{2} \cdot (F_{Z2L} - F_{Z2R}) \qquad (10)$$

Although it is assumed that the vehicle has four wheels, the bearing capacity can also be obtained using an equation similar with the equation (10) when the vehicle has six or eight wheels.

The vehicle 1 is provided with a center-of-mass height estimation device 10 for estimating a height of a center of mass of the sprung portion 5.

Figure 3:
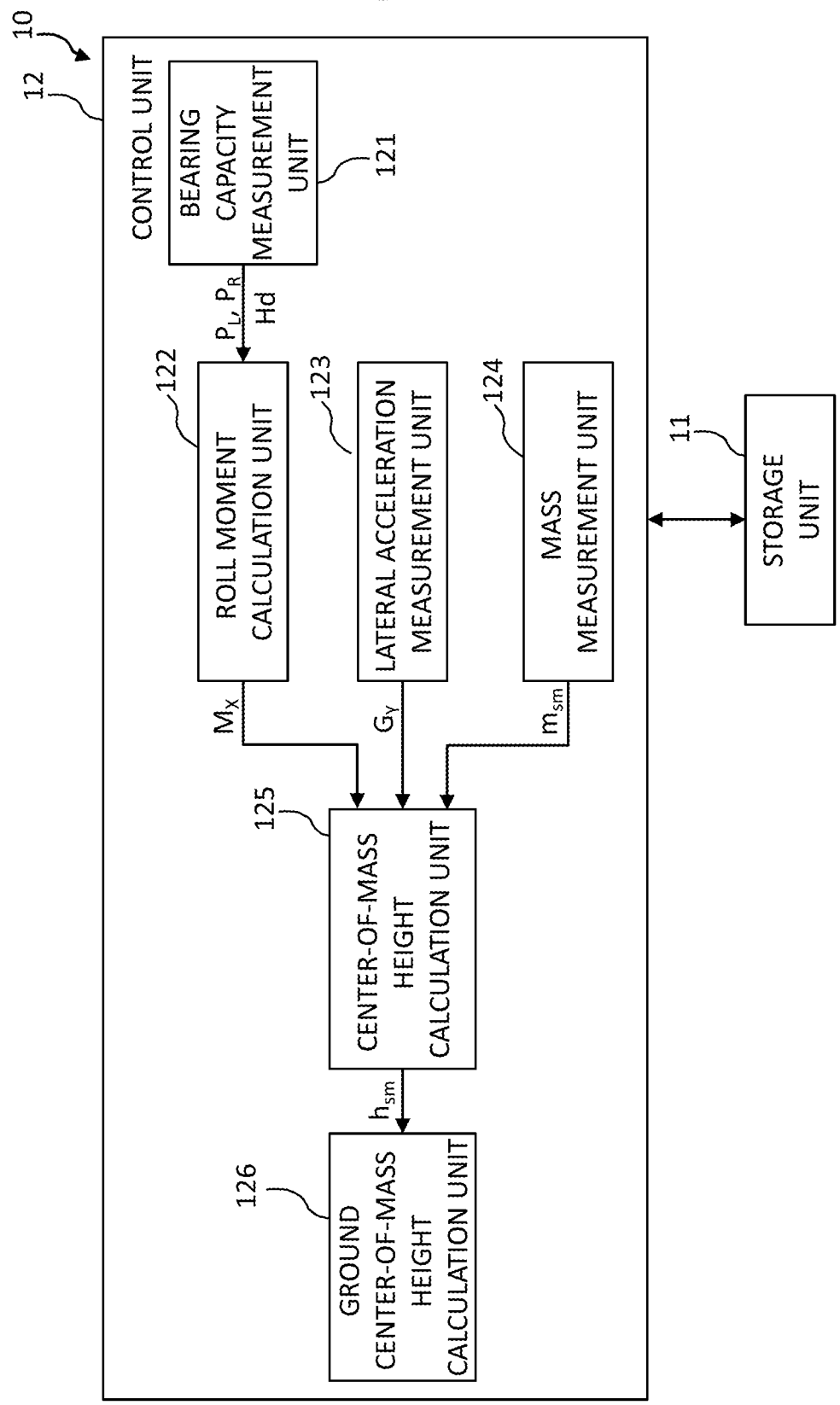
FIG. 3 is a block diagram showing a configuration of the center-of-mass height estimation device.

FIG. 3 is a block diagram showing a configuration of the center-of-mass freight estimation device 10.

The center-of-mass height estimation device 10 includes a storage unit 11 and a control unit 12. The storage unit 11 includes a storage medium such as a read only memory (ROM), a Random Access Memory (RAM), or a hard disk. The storage unit 11 stores programs to be executed by the control unit 12. The control unit 12 is, for example, a central processing unit (CPU), and functions as a bearing capacity measurement unit 121, a roll moment calculation unit 122, a lateral acceleration measurement unit 123, a mass measurement unit 124, a center-of-mass height calculation unit 125, and a ground center-of-mass height calculation unit 126 by executing programs stored in the storage unit 11.

The bearing capacity measurement unit 121 measures the bearing capacities $P_L$, $P_R$ of the left and right air suspensions 4L, 4R, respectively. For example, the hearing capacities $P_L$, $P_R$ of the left and right air suspensions 4L, 4R are measured based on pressures in the left and right suspensions 4L, 4R, respectively. The roll moment calculation unit 122 calculates the roll moment based on a difference between the bearing capacities $P_L$, $P_R$ of the left and right air suspensions 4L, 4R and a difference between pressures in the left and right suspensions. More specifically, the roll moment calculation unit 122 calculates the roll moment $M_x$ of the sprung portion 5 based on the bearing capacities $P_L$, $P_R$ of the left and right air suspensions 4L, 4R, for example, by the above equations (7) and (8). In a case where a mechanical spring such as a leaf spring or a coil spring is used in combination with the air suspension, the roll moment calculation unit 122 obtains a bearing capacity of the mechanical spring from the displacements of the left and right air suspensions in accordance with a previously generated map or the like. Further, the roll moment calculation unit 122 calculates the roll moment $M_x$ of the sprung portion 5 based on the obtained bearing capacities and the distance $Trd_2$ between the left and right air suspensions 4L, 4R, for example, by the above equations (7) to (10).

The lateral acceleration measurement unit 123 measures the lateral acceleration $G_y$ of the vehicle 1. The mass measurement unit 124 measures the mass $m_{sm}$ of the sprung portion 5. The mass measurement unit 124 measures the mass $m_{sm}$ of the sprung mass 5 based on the displacement of each suspension of the vehicle 1.

The center-of-mass height calculation unit 125 calculates a proportional coefficient D of the roll moment $M_x$ of the sprung portion 5 to the lateral acceleration $G_y$, and calculates a value obtained by dividing the proportional coefficient D by the mass $m_{sm}$ of the sprung portion 5 as the height $h_{sm}$ from the roll center RC of the vehicle 1 to the center of mass Q of the sprung portion 5.

The ground center-of-mass height calculation unit 126 adds a height $H_{RC}$ from the ground to the roll center RC to the height $h_{sm}$ from the roll center RC of the vehicle 1 to the center of mass Q of the sprung portion 5 which is calculated by the center-of-mass height calculation unit 125, so as to calculate a height $H_{CG}$ from the ground to the center of mass Q of the sprung portion 5.

Figure 4:
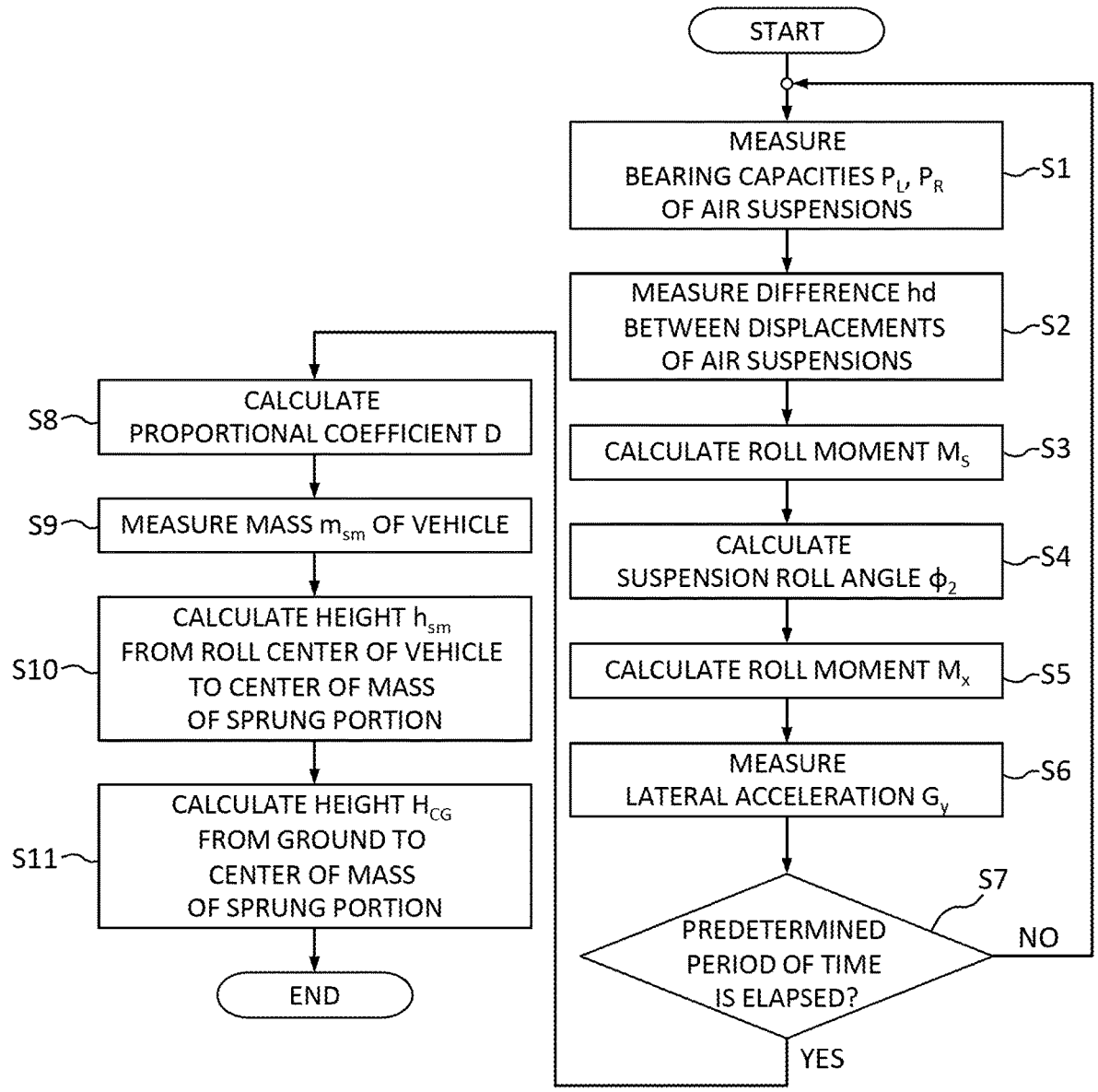
FIG. 4 is a flowchart showing operations of the center-of-mass height estimation device.

Next, operations of the center-of-mass height estimation device 10 will be described with reference to a flowchart of FIG. 4. First, the bearing capacity measurement unit 121 measures the bearing capacities $P_L$, $P_R$ of the left and right air suspensions 4L 4R (step S1). Next, the bearing capacity measurement unit 121 measures the difference $h_d$ between the upper-lower displacements of the left and right air suspensions 4L, 4R (step S2).

The roll moment calculation unit 122 calculates the roll moment $M_s$ supported by the air suspensions 4L, 4R using the bearing capacities $P_L$, $P_R$ of the left and right air suspensions 4L, 4R (step S3). Further, the roll moment calculation unit 122 calculates the suspension roll angle $\varphi_2$ using the difference hd between displacements of the left and right air suspensions 4L, 4R (step S4). The roll moment calculation unit 122 calculates the roll moment $M_x$ of the sprung portion 5 in accordance with the equation (7) (Step S5). The lateral acceleration measurement unit 123 measures the lateral acceleration $G_y$ of the vehicle 1 (step S6).

Further, the center-of-mass height calculation unit 125 repeats steps S1 to S6 until a predetermined period of time elapses after the bearing capacity measurement unit 121 starts measuring the bearing capacities $P_L$, $P_R$ (Step S7). That is, steps S1 to S6 are executed at time points $t_1, t_2, t_3 \ldots t_n$ while the vehicle is stopped or traveling and roll moment $M_{x1}, M_{x2}, M_{x3} \ldots M_{xn}$ and lateral acceleration $G_{y1}, G_{y2}, G_{y3} \ldots G_{yn}$ at the time points $t_1$ to $t_n$ is calculated. The predetermined period of time is a period of time for the center-of-mass height calculation unit 125 to sample such as the bearing capacities $P_L$, $P_R$ necessary for obtaining the height $h_{sm}$ from the roll center RC of the vehicle 1 to the center of mass Q of the sprung portion with predetermined accuracy.

Figure 5:
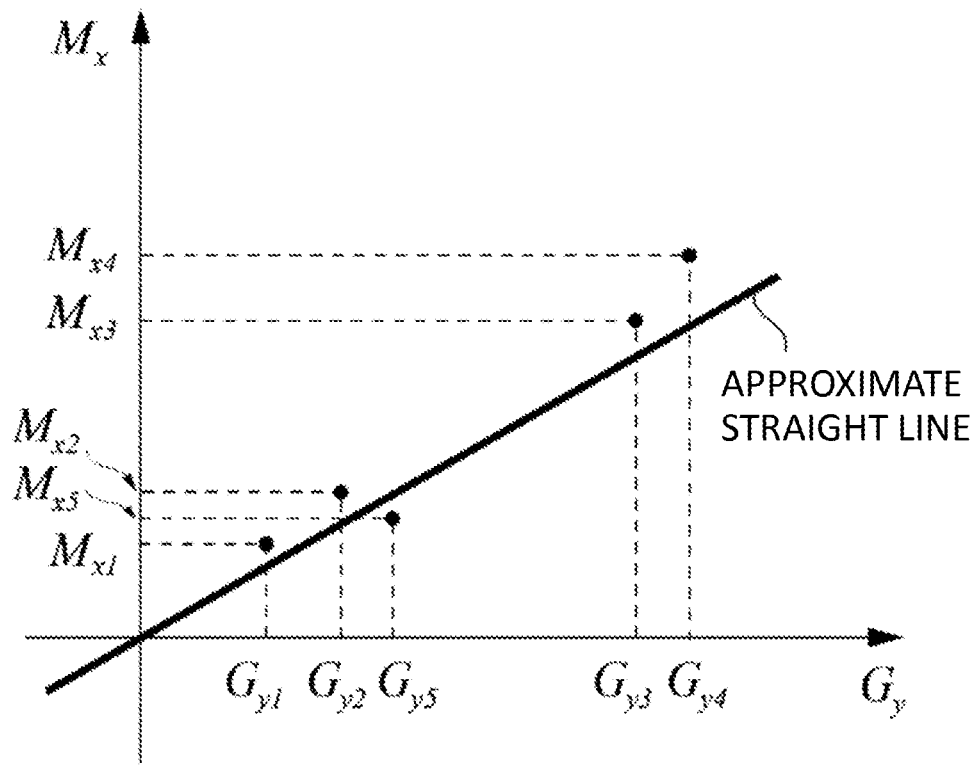
FIG. 5 is a graph showing an approximate straight line of roll moment/lateral acceleration.

FIG. 5 is a graph showing an approximate straight line of "Roll moment $M_x$/Lateral acceleration $G_y$". As shown in FIG. 5, the center-of-mass height calculation unit 125 generates a graph with the lateral acceleration $G_y$ as the horizontal axis and the roll moment $M_x$ as the vertical axis, and values obtained in steps S5 and S6 are plotted on the graph to obtain an approximate straight line of $M_x/G_y$ by a least squares method. A slope of the approximate straight line is taken as the proportional coefficient D (step S8).

The mass measurement unit 124 measures the mass $m_{sm}$ of the vehicle 1 (step S9). The center-of-mass height calculation unit 125 calculates the height $h_{sm}$ from the roll center RC of the vehicle 1 to the center of mass Q of the sprung portion in accordance with the equation (3) (step S10). Further, the ground center-of-mass height calculation unit 126 calculates the height $H_{CG}$ from the ground to the center of mass Q of the sprung portion 5 using the height $h_{sm}$ from the roll center RC of the vehicle 1 to the center of mass Q of the sprung portion 5 (step S11).

Effects of First Embodiment

As described above, according to the center-of-mass height estimation device 10 of the present embodiment, the proportional coefficient D of the roll moment $M_x$ of the sprung portion 5 to the lateral acceleration $G_y$ is calculated, and the value obtained by dividing the proportional coefficient D by the mass $m_{sm}$ of the sprung portion 5 is calculated as the height $h_{sm}$ from the roll center RC of the vehicle 1 to the center of mass Q of the sprung portion 5. Therefore, even in a case where the vehicle stops at the distribution bases or the like, the arrangement or mass of the load variously changes and the center of mass of the load changes, the height from the roll center RC of the vehicle 1 to the center of mass Q of the sprung portion 5 can be estimated simply by measuring the bearing capacities $P_L$, $P_R$ of the left and right air suspensions 4L, 4R, the difference hd between the displacements, and the lateral acceleration $G_y$. The height from the roll center RC of the vehicle 1 to the center of mass Q of the sprung portion 5 can be easily estimated during normal traveling without the need for a special external facility.

Since the proportional coefficient D of the roll moment $M_x$ to the lateral acceleration $G_y$ is obtained by the least squares method, the height of the center of mass of the sprung portion 5 can be estimated with high accuracy even if the measured values of the lateral acceleration $G_y$ and the roll moment $M_x$ vary.

Second Embodiment

In the first embodiment, an example has been described in which the proportional coefficient D of the roll moment $M_x$ with respect to the lateral acceleration $G_y$ is obtained by the least square method. Whereas, in a second embodiment, an example will be described in which a gain D' of a frequency transfer function of roll moment $M_x$ with respect to the lateral acceleration $G_y$ is calculated.

Figure 6A:
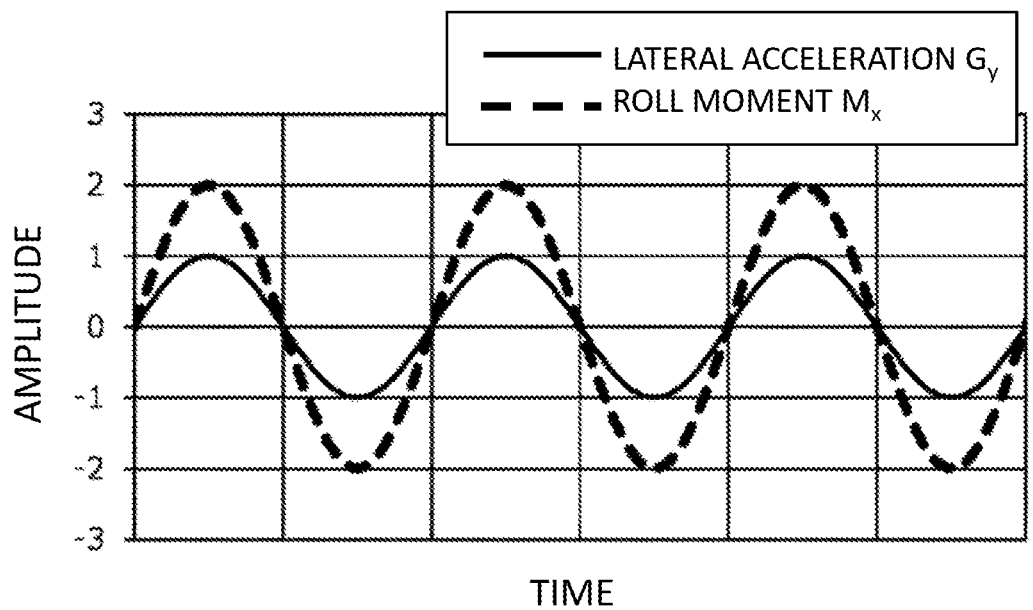
FIG. 6A is a graph schematically showing a relationship between the lateral acceleration and the roll moment.
Figure 6B:
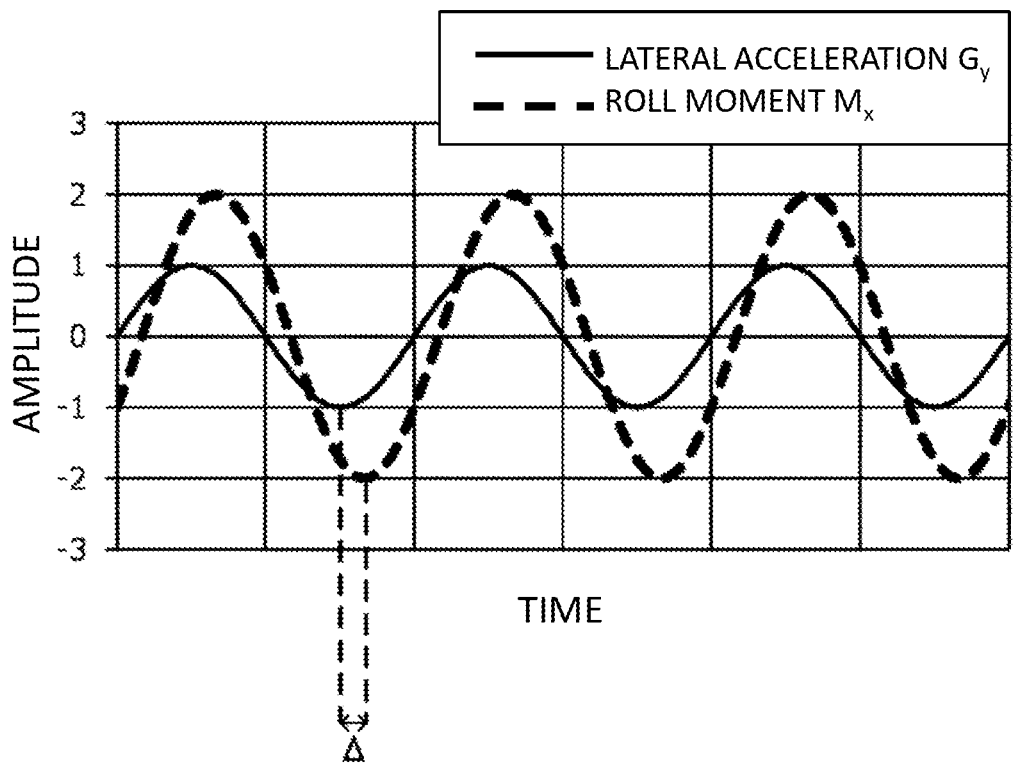
FIG. 6B is a graph schematically showing a relationship between the lateral acceleration and the roll moment.

FIGS. 6A and 6B are diagrams schematically showing a relationship between the lateral acceleration $G_y$ and the roll moment $M_x$, and show variations of the lateral acceleration $G_y$ and the roll moment $M_x$. FIG. 6A shows that the lateral acceleration $G_y$ and the roll moment $M_x$ vibrate in the same phase, and FIG. 6B shows that the roll moment $M_x$ vibrates with a delay of a phase $\Delta$ as compared with the lateral acceleration $G_y$.

In the graphs of FIGS. 6A and 6B, the horizontal axis represents time and the vertical axis represents amplitude. In examples of FIGS. 6A and 6B, the lateral acceleration $G_y$ shows a sine waveform of amplitude 1 as indicated by a solid line, and the roll moment $M_x$ shows a sine waveform of amplitude 2 as indicated by a broken line. As shown in FIG. 6A, when the lateral acceleration G and the roll moment $M_x$ coincide in phase, the proportional coefficient D represented by an amount of change of the roll moment $M_x$ of the vehicle 1 to an amount of change of the lateral acceleration $G_y$ in the equation (6) is 2.

Meanwhile, as shown in FIG. 6B, when the roll moment $M_x$ vibrates with a delay of a phase $\Delta$ as compared with the lateral acceleration $G_y$, the proportional coefficient D varies with time. For example, if the center-of-mass height calculation unit 125 calculates the proportional coefficient D by the least squares method, the proportional coefficient D is smaller as compared with a case where the lateral acceleration $G_y$ and the roll moment $M_x$ coincide in phase, so that accuracy of the proportional coefficient D may decrease.

In a case where the roll moment $M_x$ is affected by noise due to unevenness of a road surface, the accuracy of the proportional coefficient D tends to decrease if the proportional coefficient D is calculated by the least squares method.

Therefore, the center-of-mass height estimation system according to the second embodiment calculates the gain D' of the transfer function of the roll moment $M_x$ with respect to the lateral acceleration $G_y$. The gain D' is not affected by a phase difference between the lateral acceleration $G_y$ and the roll moment $M_x$. Therefore, it is possible to prevent the decrease in calculation accuracy of the height $h_{sm}$ from the roll center RC of the vehicle 1 to the center of mass Q of the sprung portion resulted by the phase difference between the lateral acceleration $G_y$ and the roll moment $M_x$.

The center-of-mass height estimation system according to the second embodiment calculates the height $h_{sm}$ from the roll center of the vehicle 1 to the center of mass Q of the sprung portion 5 using a low frequency component of the gain D' of the frequency transfer function. Since the center-of-mass height estimation system excludes a high frequency component of the gain D', which is susceptible to noise due to unevenness of a road surface and electrical noise during A/D conversion, by using the low frequency component of the gain D' of a frequency transfer function F, the height $h_{sm}$ from the roll center RC to the center of mass Q of the sprung portion 5 can be calculated with higher accuracy.

Figure 7:
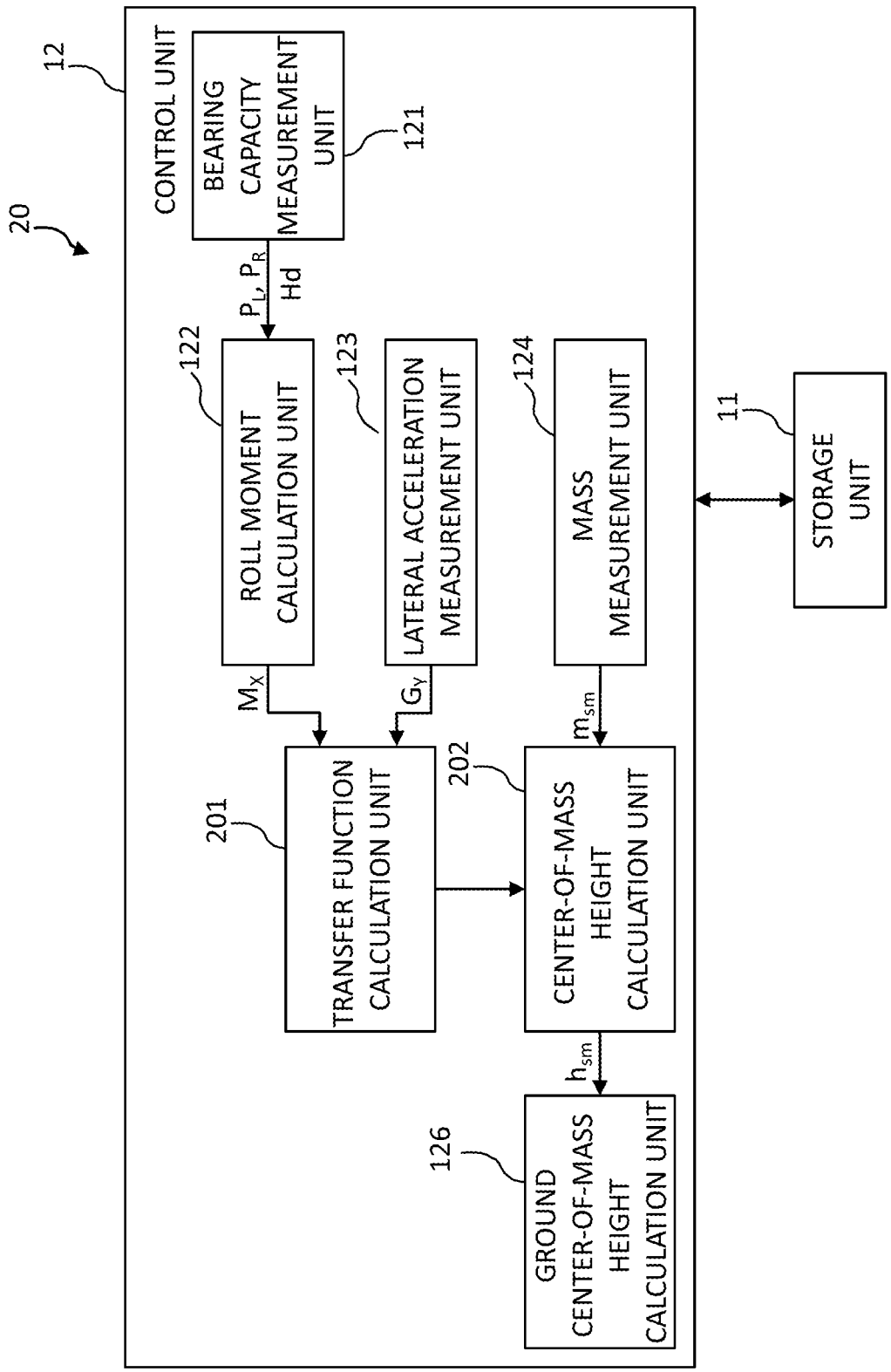
FIG. 7 is a block diagram showing a configuration of a center-of-mass height estimation device according to a second embodiment.

FIG. 7 is a block diagram showing a configuration of a center-of-mass height estimation device 20 according to the second embodiment.

When being compared with the center-of-mass height estimation device 10 in FIG. 3, the center-of-mass height estimation device 20 is different in further including a transfer function calculation unit 201 and a center-of-mass height calculation unit 202 in the control unit 12 but not including the center-of-mass height calculation unit 125. Hereinafter, in the center-of-mass height estimation device 20 according to the second embodiment, the same functional blocks as those of the center-of-mass height estimation device 10 according to the first embodiment are given the same reference numerals and the description thereof is omitted.

The transfer function calculation unit 201 calculates a frequency transfer function of the roll moment $M_x$ with respect to the lateral acceleration $G_y$. Here, a case where the transfer function calculation unit 201 calculates the frequency transfer function by an average periodogram method will be described. A cross spectrum $H_{MG}$ of the lateral acceleration $G_y$ and the roll moment $M_x$ is expressed by the following equation (11). In the equation (11), $R(M_x)$ is Fourier transform of the roll moment $M_x$. $S(G_y)$ is set to Fourier transform of the lateral acceleration $G_y$ and $S^*(G_y)$ is set to complex conjugate of $S(G_y)$.

$$H_{MG}=R(M_x)\cdot S^*(G_y) \tag{11}$$

An auto power spectrum HGG of the lateral acceleration $G_y$ is expressed by the following equation (12).

$$H_{GG}=S(G_y)\cdot S^*(G_y) \tag{12}$$

In the equation (12), $S^*(G_y)$ is complex conjugate of $S(G_y)$. In this case, the frequency transfer function F of the roll moment $M_x$ with respect to the lateral acceleration $G_y$ is represented by the following equation (13).

$$F = \frac{H_{MG}}{H_{GG}} = \frac{R(M_x)}{S(G_y)} \tag{13}$$

The center-of-mass height calculation unit 202 divides the gain D' of the frequency transfer function F by the mass $m_{sm}$ of the sprung portion 5 so as to calculate the height $h_{sm}$ from the roll center RC of the vehicle 1 to the center of mass Q of the sprung portion. Operations of the center-of-mass height calculation unit 202 will be described with reference to FIG. 8.

Figure 8:
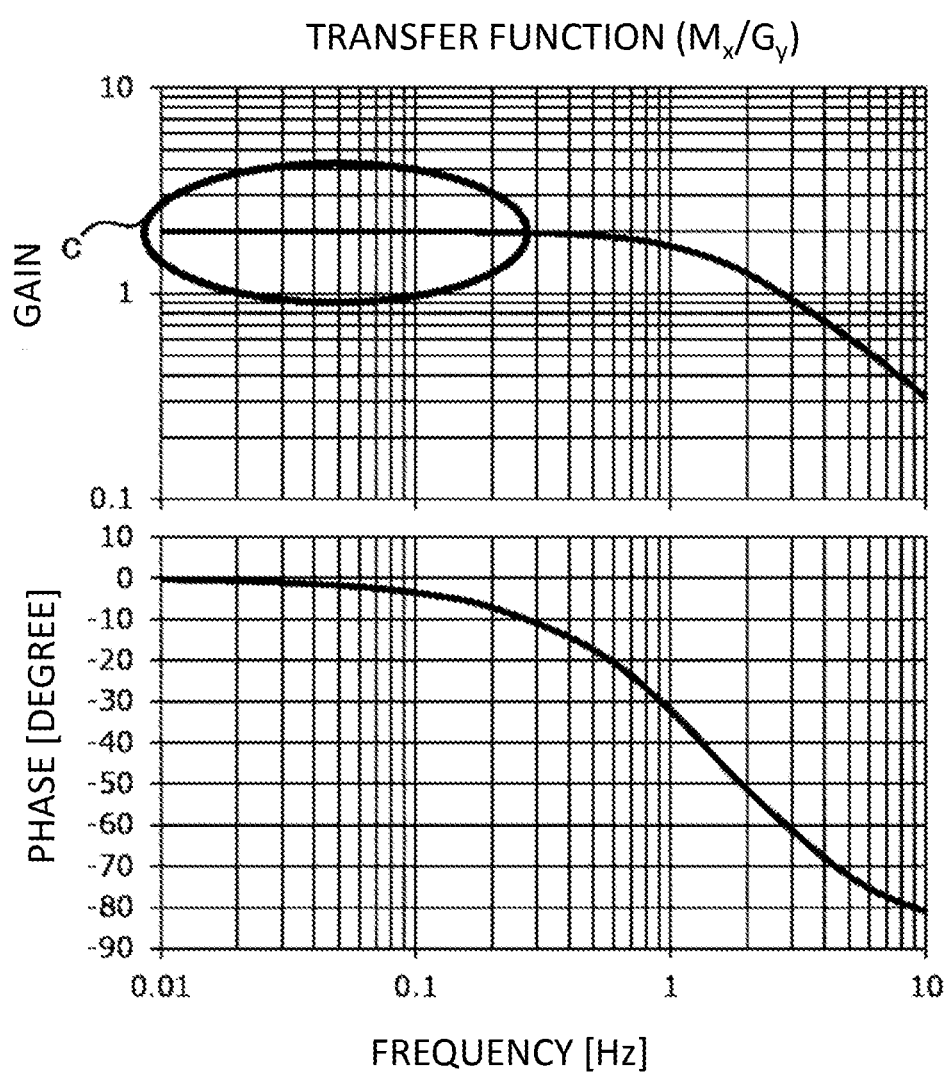
FIG. 8 is a graph schematically showing a gain and a phase of a frequency transfer function.

FIG. 8 is a graph schematically showing the frequency transfer function F of the roll moment $M_x$ with respect, to the lateral acceleration $G_y$. An upper graph in FIG. 8 is a double logarithmic chart showing the frequency on the horizontal axis and the gain on the vertical axis on a logarithmic scale. A lower graph in FIG. 8 is a single logarithmic chart showing the frequency on the logarithmic scale on the horizontal axis and the phase on the vertical axis. As shown in the upper graph of FIG. 8, the gain D' of the frequency transfer function F is substantially constant with a maximum value of about 2 at the frequency of 0.01 Hz to 0.3 Hz indicated by a circle C in FIG. 8, and decreases as the frequency increases. The high frequency component of the gain D' of the frequency transfer function F includes electrical noise during A/D conversion and noise due to unevenness of the road surface during straight traveling.

Therefore, in order to remove the influence of noise, the center-of-mass height calculation unit 202 acquires gain D' corresponding to a frequency equal to or less than a predetermined value, as shown by the circle C in FIG. 8, among the gains D' of the frequency transfer function F. The predetermined value is an upper limit value of the gain D' of the frequency transfer function F experimentally confirmed to be usable, for example, for accurately determining the height $h_{sm}$ from the roll center RC of vehicle 1 to the center of mass Q of sprung portion 5, and is, for example, 1 Hz at most. In a case where there are a plurality of gains D' of frequency transfer function each corresponding to a frequency equal to or lower than the predetermined value, the center-of-mass height calculation unit 202 acquires a statistic of the plurality of gains D' of the frequency transfer function. The statistic is, for example, an average value, but may be a median or a mode.

The description will now return to FIG. 7. Similarly with the equation (6), the center-of-mass height calculation unit 202 divides the gain D' of the frequency transfer function F by the mass $m_{sm}$ of the sprung portion 5 so as to calculate the height $h_{sm}$ from the roll center RC of the vehicle 1 to the center of mass Q of the sprung portion 5, as shown in the following equation (14).

$$h_{sm} = \frac{1}{m_{sm}} \cdot D' \quad (14)$$

The center-of-mass height calculation unit 202 reads an allowable range of the gain D' of the frequency transfer function F from the storage unit 11. The allowable range of the gain D' is, for example, a possible range of the gain D' previously obtained by experiments. The center-of-mass height calculation unit 202 compares the read allowable range with statistics of the gain D' of the frequency transfer function F calculated for each of the time points $t_1$, $t_2$, $t_3$ ... $t_n$ while the vehicle is stopped or traveling. The time points $t_1$, $t_2$, $t_3$ ... $t_n$ are, for example, time points determined at predetermined time intervals.

The center-of-mass height calculation unit 202 further calculates an average value over the time points $t_1$ to $t_n$ for statistics each having a value within the allowable range, among the statistics of the gain D' of the frequency transfer function F calculated for each of the time points $t_1$, $t_2$, $t_3$ ... $t_n$. The center-of-mass height calculation unit 202 divides the average value over the time points $t_1$ to $t_n$ by the mass $m_{sm}$ of the sprung portion 5 so as to calculate the height $h_{sm}$ from the roll center RC of the vehicle 1 to the center of mass Q of the sprung portion 5.

Figure 9:
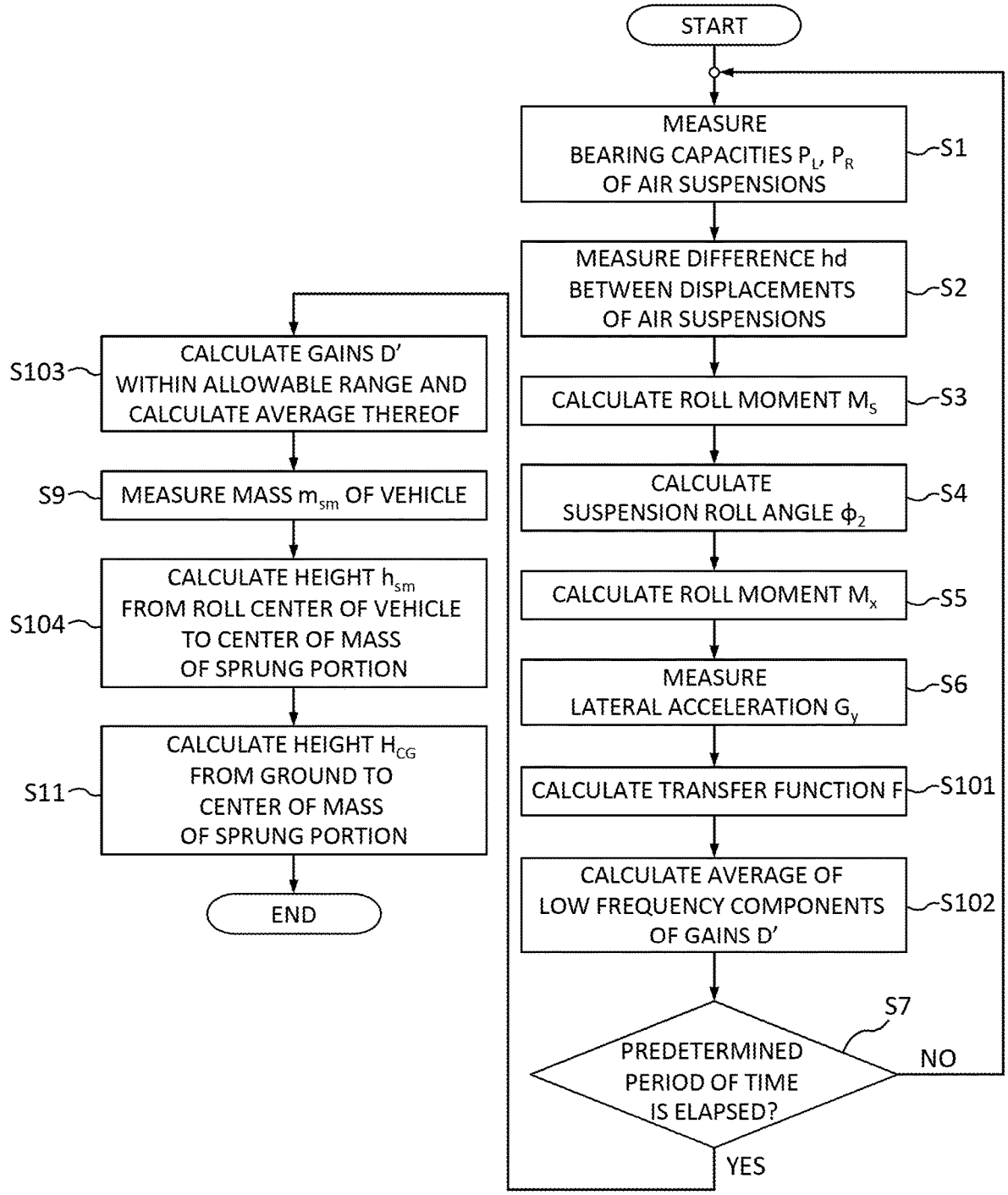
FIG. 9 is a flowchart showing operations of the center-of-mass height estimation device.

Steps S1 to S7, S9 and S11 and steps S101 to S104 in FIG. 9 form a flowchart showing the operations of the center-of-mass height estimation device 20. Steps S1 to S6 and step S11 are the same as those in the flowchart of FIG. 4, and description thereof will be omitted.

In step S101, the transfer function calculation unit 201 calculates the frequency transfer function F using the roll moment $M_x$ and the lateral acceleration $G_y$ of the air suspensions 4L, 4R by an average periodogram method (step S101). Next, the transfer function calculation unit 201 acquires a gain D' corresponding to a frequency of a low frequency component among the gains D' of the frequency transfer function F, for example, a gain D' corresponding to a frequency equal to or less than a predetermined value. In a case where there are a plurality of gains D' each corresponding to a frequency equal to or lower than the predetermined value, an average value of the gains D' is calculated (step S102).

The center-of-mass height calculation unit 202 repeats steps S1 to S6, S101, and S102 until a predetermined period of time elapses since the bearing capacity measurement unit 121 starts measuring the bearing capacities $P_L$, $P_R$ (step S7). That is, steps S1 to S6, S101 and S102 are executed at the time points $t_1$, $t_2$, $t_3$ ... $t_n$ while the vehicle is stopped or traveling and the frequency transfer function F at each of the time points $t_1$ to $t_n$ is calculated, and an average value of the gains D' of the transfer function F each having a frequency equal to or less than a predetermined value is calculated for each of the time points $t_1$, $t_2$, $t_3$ ... $t_n$. The predetermined period of time is a period of time for the center-of-mass height calculation unit 202 to sample the bearing capacities $P_L$, $P_R$ necessary for obtaining the height of the center of mass with predetermined accuracy.

The center-of-mass height calculation unit 202 compares the read allowable range with the average values of the gains D' of the frequency transfer function F calculated for each of the time points $t_1$, $t_2$, $t_3$ ... $t_n$, and acquires average values each having a value within the allowable range among the average values of the gains D' of the frequency transfer function F corresponding to the time points $t_1$, $t_2$, $t_3$ ... $t_n$. The center-of-mass height calculation unit 202 averages the acquired average values over the time points $t_1$ to $t_n$ to calculate an average value over the time points $t_1$ to $t_n$ (step S103).

Further, the mass measurement unit 124 measures the mass $m_{sm}$ of the vehicle 1 (step S9), and the center-of-mass height calculation unit 202 calculates the height $h_{sm}$ form the roll center RC of the vehicle 1 to the center of mass Q of the sprung portion 5 according to the equation (14) (step S104).

Effects of Second Embodiment

According to the present embodiment, since the center-of-mass height calculation unit 202 calculates the height $h_{sm}$ from the roll center RC of the vehicle 1 to the center of mass Q of the sprung portion 5 using the gain D' of the frequency transfer function F, the accuracy decrease in calculation of the height of the center of mass Q resulted by the phase difference between lateral acceleration $G_y$ and roll moment $M_x$ can be prevented.

According to the present embodiment, the center-of-mass height calculation unit 202 divides the gain D' of the transfer function F having a frequency equal to or lower than a predetermined value among the gains D' of the frequency transfer function F, by the mass $m_{sm}$ of the sprung portion 5 so as to calculate the height $h_{sm}$ from the roll center RC of the vehicle 1 to the center of mass Q of the sprung portion 5. For this reason, in a case where the roll moment $M_x$ is affected by noise due to the unevenness of the road surface, the high frequency component of the gain D' susceptible to noise is removed and the height of the center of mass Q is calculated using the low frequency component of the gain D', so that the height of the center of mass Q can be calculated with higher accuracy.

In the present embodiment, an example has been described in which the transfer function calculation unit 201 calculates the frequency transfer function of the roll moment $M_x$ to the lateral acceleration $G_y$ using the average periodogram method. However, the present disclosure is not limited thereto. For example, the transfer function calculation unit 201 may calculate the frequency transfer function using an autoregressive moving average (ARMA) model. In this case, for the lateral acceleration $G_y$ and the roll moment $M_x$, a power spectrum of the lateral acceleration $G_y$ and a power spectrum of the roll moment $M_x$ are respectively obtained using the autoregressive moving average model. Further, the gain D' of the frequency transfer function of the roll moment $M_x$ with respect to the lateral acceleration $G_y$ can be obtained using the power spectrum of the lateral acceleration $G_y$ and the power spectrum of the roll moment $M_x$.

In the present embodiment, an example has been described in which the center-of-mass height calculation unit 202 further calculates an average value over the time points $t_1$ to $t_n$ for statistics each having a value within the allowable range, among the statistics of the gain D' of the frequency transfer function F calculated for each of the time points $t_1, t_2, t_3 \ldots t_n$, and divides the average value by the mass $m_{sm}$ of the sprung portion 5. However, the present disclosure is not limited to the configuration in which the average value of the statistics of the gain D' over the time points $t_1$ to $t_n$ is calculated. For example, the center-of-mass height calculation unit 202 may calculate the height $h_{sm}$ from the roll center RC of the vehicle 1 to the center of mass Q of the sprung portion 5 by dividing any one of the statistics of the gain D' of the frequency transfer function F calculated for each of the time points $t_1$ to $t_n$ by the mass $m_{sm}$ of the sprung portion 5. The height $h_{sm}$ from the roll center RC of the vehicle 1 to the center of mass Q of the sprung portion 5 can be calculated more accurately using the statistics of the gain D' of the frequency transfer function F.

Although the present disclosure has been described using the first and second embodiments, the technical scope of the present disclosure is not limited to the scope described in the above embodiments. It is apparent to persons skilled in the art that various modifications and improvements can be applied to the above-described embodiments. It is also apparent from description of the scope of claims that an embodiment with such alterations or improvements can be included in the technical scope of the present disclosure.

The present application is based on the Japanese Patent Application (No. 2017-081676) filed on Apr. 17, 2017, contents of which are incorporated herein as reference.

INDUSTRIAL APPLICABILITY

The center-of-mass estimation device of the present disclosure is useful in the point of estimating a height of a center of mass in a vehicle such as a commercial vehicle.

LIST OF REFERENCE NUMERALS 1 vehicle
2 unsprung portion
3L left rear wheel
3R right rear wheel
4L 4R air suspension
5 sprung portion
6 load
10 center-of-mass height estimation device
11 storage unit
12 control unit
20 center-of-mass height estimation device
121 bearing capacity measurement unit
122 roll moment calculation unit
123 lateral acceleration measurement unit
124 mass measurement unit
125 center-of-mass height calculation unit
126 ground center-of-mass height calculation unit
201 transfer function calculation unit
202 center-of-mass height calculation unit

The invention claimed is:

1. A center-of-mass height estimation device, comprising:
    a roll moment calculation unit configured to calculate roll moment of a sprung portion in a vehicle based on bearing capacities of left and right suspensions provided on the vehicle;
    a lateral acceleration measurement unit configured to measure lateral acceleration, which is acceleration in a width direction of the vehicle;
    a mass measurement unit configured to measure mass of the sprung portion;
    a transfer function calculation unit configured to calculate a transfer function of the roll moment with respect to the lateral acceleration; and
    a center-of-mass height calculation unit configured to divide a gain of the transfer function by the mass of the sprung portion to calculate a height from a roll center of the vehicle to a center of mass of the sprung portion.

2. The center-of-mass height estimation device according to claim 1,
    wherein the center-of-mass height calculation unit divides the gain of the transfer function, which corresponds to a frequency equal to or less than a predetermined value among gains of the transfer function, by the mass of the sprung portion to calculate the height from the roll center of the vehicle to the center of mass of the sprung portion.

3. The center-of-mass height estimation device according to claim 2,
    wherein the center-of-mass height calculation unit divides a statistic obtained from a plurality of gains of the transfer function, which correspond to the frequency equal to or less than the predetermined value, by the mass of the sprung portion to calculate the height from the roll center of the vehicle to the center of mass of the sprung portion.

4. The center-of-mass height estimation device according to claim 1,
    wherein each of the left and right suspensions is an air suspension, and
    the roll moment calculation unit calculates the roll moment based on a difference between displacements of the left and right suspensions and a difference between pressures in the left and right suspensions.

* * * * *